April 28, 1925.

J. E. JONES

ANEMOMETER

Filed March 31, 1924   2 Sheets-Sheet 1

WITNESSES

INVENTOR

April 28, 1925.
J. E. JONES
ANEMOMETER
Filed March 31, 1924        2 Sheets-Sheet 2
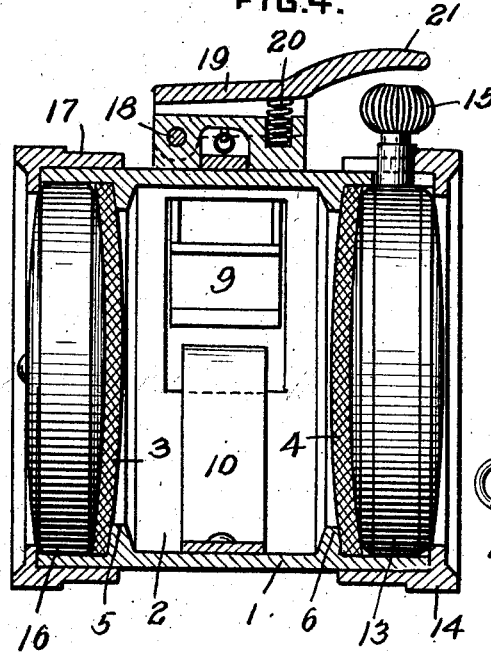
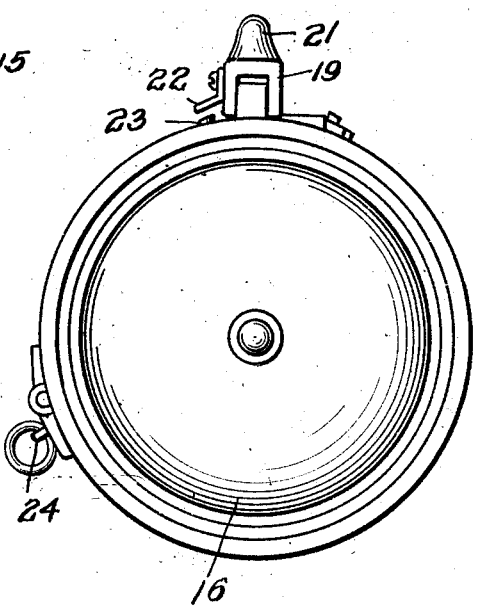
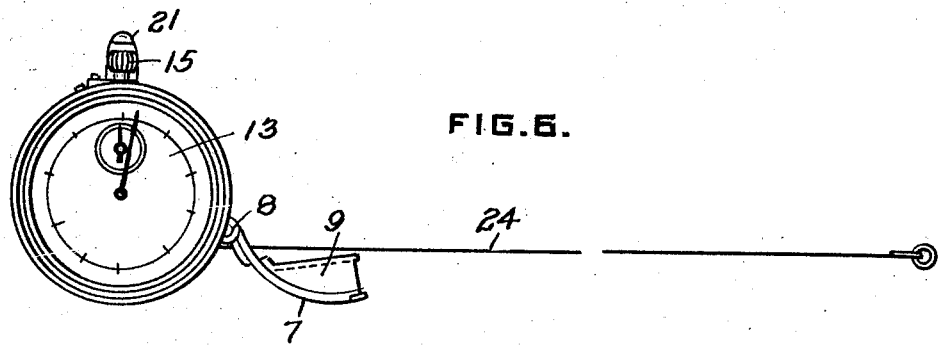
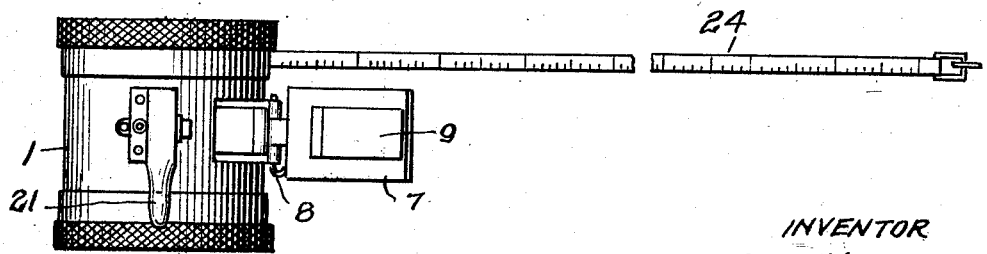
WITNESSES
INVENTOR
John E. Jones.

Patented Apr. 28, 1925.

1,535,421

UNITED STATES PATENT OFFICE.

JOHN E. JONES, OF WEST FRANKFORT, ILLINOIS, ASSIGNOR TO MINE SAFETY APPLIANCES COMPANY, OF PITTSBURGH, PENNSYLVANIA, A CORPORATION OF PENNSYLVANIA.

ANEMOMETER.

Application filed March 31, 1924. Serial No. 703,138.

*To all whom it may concern:*

Be it known that I, JOHN E. JONES, a citizen of the United States, and a resident of West Frankfort, in the county of Franklin and State of Illinois, have invented a new and useful Improvement in Anemometers, of which the following is a specification.

The general object of the invention is to provide an anemometer which is simple in construction, compact in form, and which may be easily and quickly used to determine the velocity of air.

While unlimited to any specific use, the invention is particularly applicable to measuring the velocity of air in mines. It is well known that in the operation of coal mines a volume of air not less than a prescribed minimum is required to be circulated. The existence of the required air circulation is determined by measuring the velocity of the air in various entries or passages through which it flows. Because of conditions peculiar to mines and also because of the inaccuracies of existing forms of anemometers for determining relatively low air velocities, considerable difficulty has been encountered in making sufficiently accurate air velocity determinations. Accordingly, a more specific object of the invention is to provide an anemometer particularly suitable for determining the velocity of air in mines.

Figure 2:
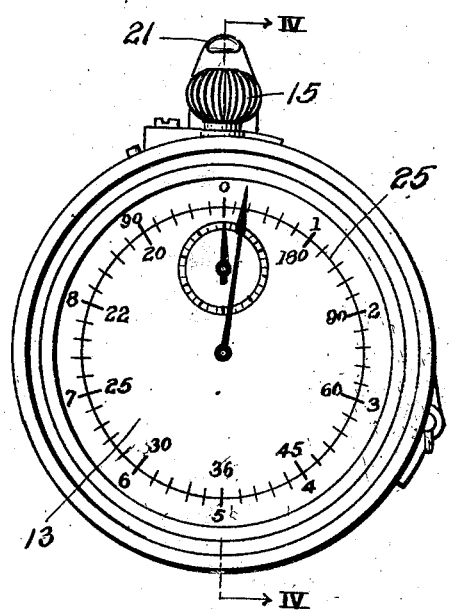
Figure 1:
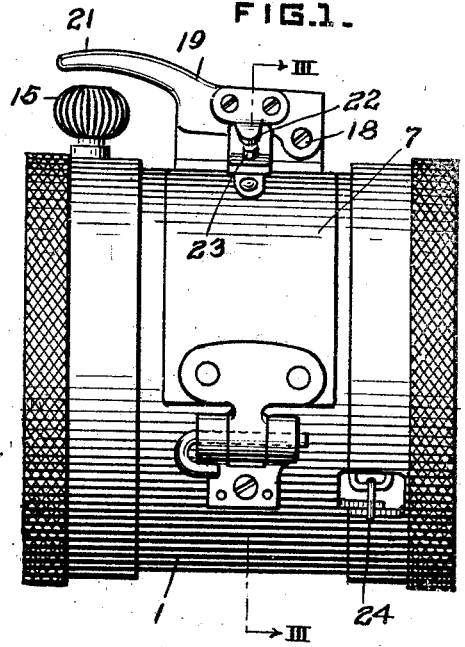
Figure 3:
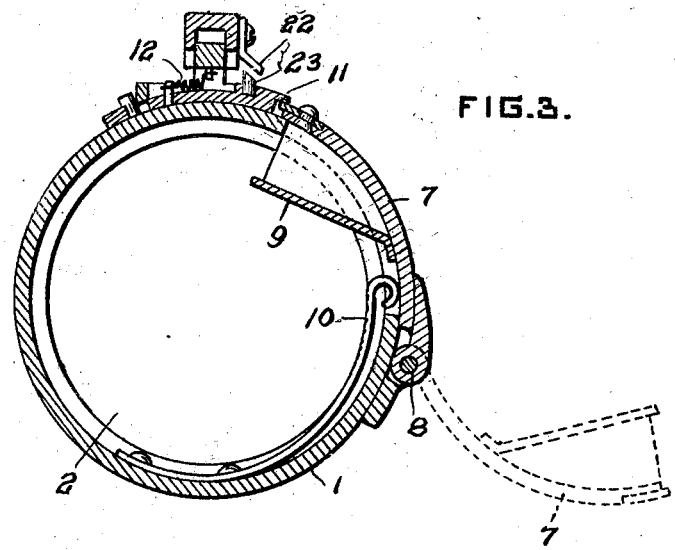

The invention is illustrated in the accompanying drawings of which Fig. 1 is a side view of an anemometer; Fig. 2 a view of the left end as seen in Fig. 1; Fig. 3 a transverse sectional view taken on the line III—III, Fig. 1; Fig. 4 a longitudinal sectional view taken on the line IV—IV, Fig. 2; Fig. 5 a view of the right end of the anemometer as seen in Fig. 1; Fig. 6 a face, and Fig. 7 a plan view of the anemometer when in use.

The anemometer provided according to this invention comprises a casing having a compartment which contains a substance which, when ejected from the compartment, is readily carried by the current of air surrounding the casing, and is visible. Such substance may be smoke or gas, or a material capable of generating either, but is preferably a light-weight and light-colored powder such as chalk dust, talcum, etc. Means are provided for ejecting from the casing small volumes of such substance, which will hereinafter be referred to as powder when it is desired to use the instrument. One end of a tape or equivalent measuring device is attached to the casing, and the casing also carries a stop-watch, the dial of which is preferably graduated to show, for various increments of time, the velocity of air for carrying powder from the casing to the outer end of the tape, which latter measures the distance upon which the velocity numerals shown on the watch dial have been calculated. The instrument also includes means for simultaneously starting the stop-watch and for operating the powder-ejecting means.

In use, an observer holds the instrument in one hand which is outstretched in the direction of the oncoming current of air, and holds the outer end of the measuring tape in his other hand directly in front of his line of vision, the tape being parallel with the flow of the air. He then moves the operating member for starting the stop-watch and for simultaneously discharging a small amount of powder from the casing of the instrument. As soon as he observes the discharged volume of powder passing the outer end of the tape in front of him he moves the operating member a second time to stop the watch. The watch, if graduated in the manner explained above, will then show the velocity of the air.

Having reference now to the illustrative embodiment of the invention, the casing 1 may be of cylindrical form, having a central powder-receiving compartment 2 formed by the central portion of the casing and diaphragms 3 and 4, the edges of which rest against interiorly projecting beads or rings 5 and 6. While small volumes of powder, or its equivalent, may be variously discharged from compartment 2, it is preferred to do this by means of a door 7 hinged to the casing wall as at 8 and provided interiorly with a cup 9 for receiving powder from the casing. Door 7 may be urged yieldingly to open position by means of a spring 10 attached to the interior of casing 1, and may be held in closed position by means of a latch 11 mounted for sliding movement on the outer wall of the casing and held yieldingly towards door-locking position by a spring 12.

A stop-watch 13 may be carried at an end of the casing between diaphragm 4 and a flanged ring 14 adapted to fit over the casing with the stem 15 of the watch projecting through the ring. At the other end of the casing there may be arranged a measuring tape reel 16 held in position between diaphragm 3 and a ring 17 also adapted to fit over the end of the casing and provided with an opening through which a tape 24 may be withdrawn. The tape 24 on reel 16 should be at least as long as the distance used in computing the velocity numerals on the stop-watch dial and may be longer for making measurements such as those of the passageway through which air is flowing.

For simultaneously starting the watch and operating the powder-ejecting door, there is preferably pivoted to the casing at 18 a lever 19, normally pressed outwardly by a spring 20 and provided at its outer end with a finger 21 adjacent to watch stem 15. As seen in Figs. 1, 3 and 5, lever 19 may be provided with a lug 22 adapted to engage an outer bevelled end of a pin 23 attached to latch 11 so that the downward movement of lever 19 causes latch 11 to move to the left as viewed in Fig. 3 and thus release door 7, which door then flies open and discharges powder contained in cup 9.

A convenient minimum length of measuring tape 24 to determine velocity is three feet. When such a tape is used the dial of watch 13 may be graduated in the manner indicated in Fig. 2 to read directly the velocity of air in feet per minute, the velocity then being three times sixty divided by the time in seconds. These velocity graduations are indicated in Fig. 2 on the inside of dial circle 25, and the seconds are indicated on the outside of this circle.

To make a velocity determination of air all that it is necessary to do is for an observer to hold the instrument in one hand which is outstretched at his side in the direction of the oncoming air, and hold the outer end of the tape in the other hand directly in his line of vision, the tape being parallel to the flow of air. Lever 19 is then pressed downwardly to release door 7 and to start the stop-watch. When the door is released it flies to open position which is indicated in dotted lines in Fig. 3 and in full lines in Figs. 6 and 7. As soon as the current of air carries the powder or its equivalent thus discharged from compartment 2 to the end of tape 24, lever 19 is again pressed to stop the watch. It has been found by extensive actual use that this anemometer gives very accurate determinations of the velocity of air, and that it is particularly well suited for use in mines where it can be quickly used by a single person.

According to the provisions of the patent statutes, I have described the principle and operation of my invention together with the constructions which I now consider to represent the best embodiment of it. However, I desire to have it understood that, within the scope of the appended claims, the invention may be practiced by other forms of construction than that particularly shown and described.

I claim as my invention:

1. An anemometer comprising a casing having a compartment for carrying a visible light-weight substance, means for ejecting such substance from the compartment, a stop-watch carried by the casing, and means for simultaneously starting said watch and operating said substance-ejecting means.

2. An anemometer comprising a casing having a compartment for carrying a visible light-weight substance, means for ejecting such substance from the compartment, a stop-watch carried by the casing, and a single movable member for simultaneously starting said watch and operating said substance-ejecting means.

3. An anemometer comprising a casing having a powder-containing compartment, a powder-ejecting door hinged to the wall of said compartment and provided on its inner face with a powder-receiving cup, a spring urging said door open, a spring-pressed latch for holding the door closed, a stop-watch carried by the casing, and a single movable member for simultaneously starting said watch and releasing said latch.

4. An anemometer comprising a casing carrying a stop-watch at one end, a measuring tape reel at its other end, and having intermediate of its ends a compartment for carrying a visible light-weight substance, means for ejecting such substance from the compartment, and means for simultaneously starting said watch and operating said substance-ejecting means.

5. An anemometer comprising a casing having a powder-containing compartment, means for ejecting powder from the compartment, a measuring tape having its inner end attached to the casing and a stop-watch having its dial graduated to show the existing velocity of air for carrying powder from said casing to the outer end of the tape, and a single means for starting said watch and operating said powder-ejecting means.

6. An anemometer comprising a casing having a powder-containing compartment, a powder-ejecting device attached to the wall of said compartment, a measuring tape having its inner end attached to the casing, a stop-watch carried by the casing having its dial graduated to show for various increments of time the existing velocity of air for carrying to the outer end of the tape powder ejected from the casing, and a single movable member for simultaneously starting said watch and operating said powder-ejecting device.

In testimony whereof, I sign my name.

JOHN E. JONES.